(12) United States Patent
Patel et al.

(10) Patent No.: US 12,322,829 B2
(45) Date of Patent: Jun. 3, 2025

(54) BATTERY PACK WITH EXHAUST CONDUIT AND GAS FLOW CHANNEL FOR THERMAL RUNAWAY PROTECTION

(71) Applicant: GM GLOBAL TECHNOLOGY OPERATIONS LLC, Detroit, MI (US)

(72) Inventors: Jishn Yogeshchandra Patel, Rochester Hills, MI (US); Vicente Domenech-Llopis, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 316 days.

(21) Appl. No.: 17/953,529

(22) Filed: Sep. 27, 2022

(65) Prior Publication Data

US 2024/0106067 A1 Mar. 28, 2024

(51) Int. Cl.
| | |
|---|---|
| *H01M 50/367* | (2021.01) |
| *H01M 50/209* | (2021.01) |
| *H01M 50/30* | (2021.01) |
| *H01M 50/317* | (2021.01) |
| *H01M 50/249* | (2021.01) |

(52) U.S. Cl.
CPC ....... *H01M 50/367* (2021.01); *H01M 50/209* (2021.01); *H01M 50/317* (2021.01); *H01M 50/394* (2021.01); *H01M 50/249* (2021.01); *H01M 2220/20* (2013.01)

(58) Field of Classification Search
CPC ............. H01M 50/367; H01M 50/209; H01M 50/317; H01M 50/394; H01M 50/249; H01M 2220/20
See application file for complete search history.

(56) References Cited

U.S. PATENT DOCUMENTS

| | | | |
|---|---|---|---|
| 2017/0237055 A1* | 8/2017 | Shimizu | H01M 50/308 429/53 |
| 2019/0288526 A1* | 9/2019 | Jaensch | H01M 10/425 |
| 2021/0066690 A1* | 3/2021 | Gondoh | H01M 50/367 |
| 2022/0271390 A1* | 8/2022 | Schüssler | H01M 50/204 |
| 2022/0416359 A1* | 12/2022 | Feltham | H01M 50/213 |
| 2023/0187774 A1* | 6/2023 | Pechan | H01M 10/653 429/56 |

* cited by examiner

*Primary Examiner* — Milton I Cano
*Assistant Examiner* — Albert Michael Hilton
(74) *Attorney, Agent, or Firm* — Quinn IP Law

(57) ABSTRACT

A battery pack includes an elongated exhaust conduit defining a gas flow channel. The exhaust conduit includes a longitudinal center axis and a terminal end having a pack vent. The battery pack also includes fins disposed within the gas flow channel, and a plurality of battery cells arranged adjacent to the exhaust conduit. Each respective battery cell includes an outer casing defining a cell cavity. The casing defines a cell vent opening. An anode and a cathode are disposed within the cell cavity, and a vent cap covers the cell vent opening. The vent cap opens at a predetermined pressure to release hot gasses from the cell cavity into the gas flow channel. The fins direct the hot gasses along the longitudinal center axis and toward the terminal end of the exhaust conduit, and thus to the pack vent for discharge to the surrounding ambient environment.

20 Claims, 3 Drawing Sheets

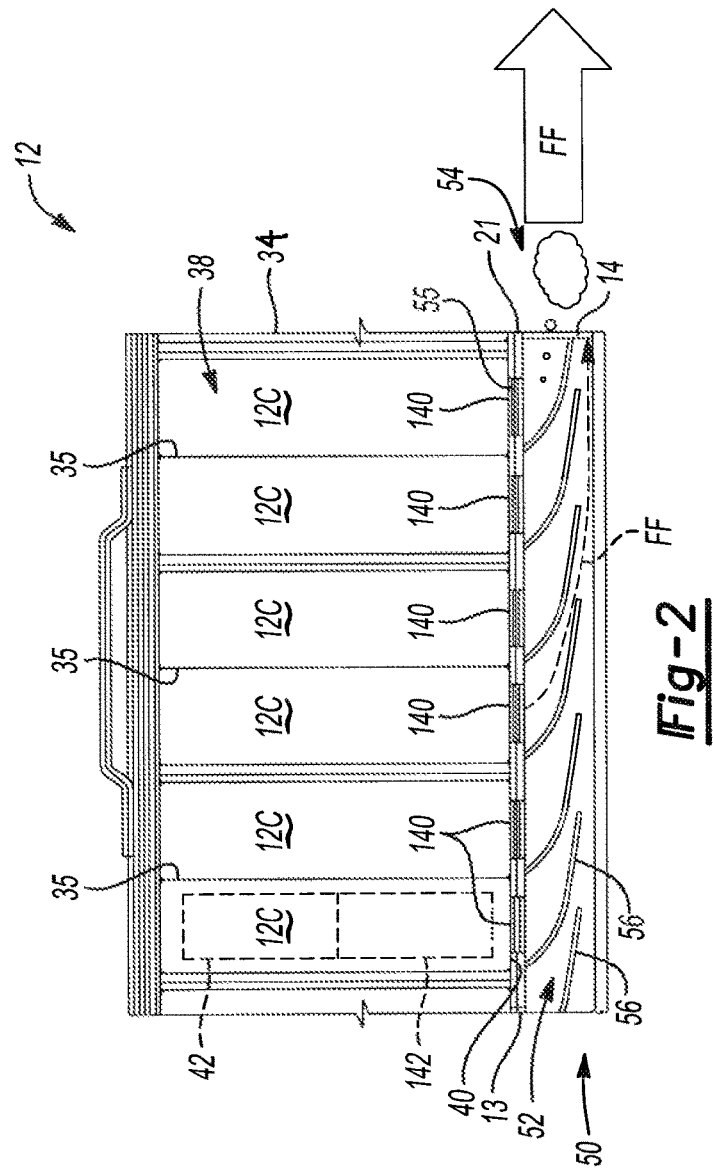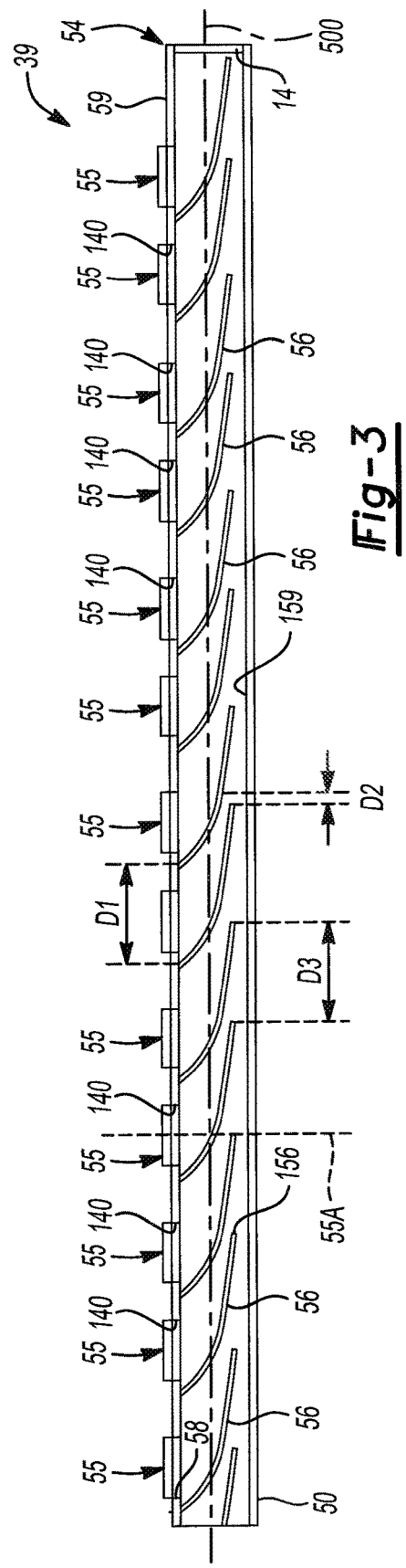

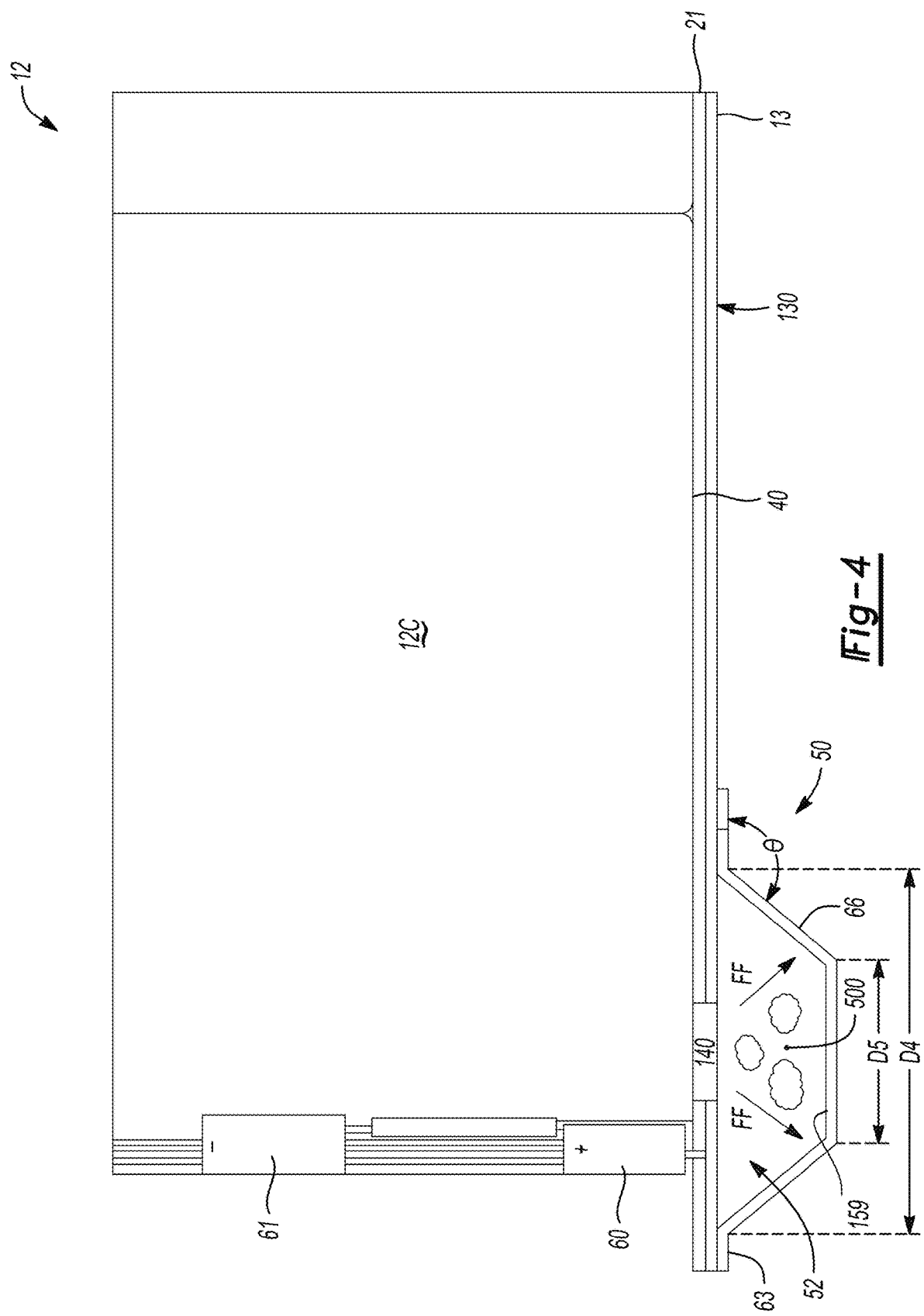

BATTERY PACK WITH EXHAUST CONDUIT AND GAS FLOW CHANNEL FOR THERMAL RUNAWAY PROTECTION

INTRODUCTION

Electrochemical battery packs are used in a wide range of battery electric systems. Aboard an electric or hybrid electric vehicle, for instance, a high-energy rechargeable propulsion battery pack is arranged on a direct current (DC) voltage bus. The DC voltage bus ultimately powers one or more electric traction motors, generators, and associated high-voltage components by discharging constituent electrochemical battery cells of the battery pack.

Battery packs configured for use aboard electric vehicles and other high-energy battery electric systems are constructed from an application-suitable number of cylindrical, prismatic, or pouch-style battery cells. In a typical lithium-ion battery cell, for instance, a controlled movement of electrons and lithium ions produces electricity for use in energizing the above-noted electric machines and components. Charging and discharging of the individual battery cells generates waste heat. The waste heat is then dissipated from the battery cells, e.g., using a circulated battery coolant or cooling plates. Factors such as battery cell damage, age, and degradation could lead to cell-level or pack-level heat generation rates exceeding the cooling capability of the thermal management system. Such a condition is referred to herein and in the general art as thermal runaway.

SUMMARY

A battery pack is disclosed herein having a plurality of electrochemical battery cells. Each battery cell is equipped with an outer casing and a corresponding vent opening ("cell vent") disposed on a surface thereof. The cell vent is configured to open in response to elevated cell pressures indicative of a thermal runaway condition. That is, thermal runaway occurring within a given battery cell results in heat, with the generated heat in turn causing the cell pressure to rise. Ultimately, the cell pressure is sufficient for bursting a vent membrane, ejecting a vent cap, or otherwise causing the cell vent to open. The open cell vent thereafter expels hot gasses and particulate matter from within the battery cell.

In addition to such cell vents, the battery pack is equipped with an elongated exhaust conduit that runs alongside the outer casing adjacent to the battery cells and cell vents. A gas flow channel defined by the exhaust conduit receives the hot gasses from one or more of the venting battery cells and directs the gasses toward a terminal end of the gas flow channel. A pack vent disposed at the terminal end opens in a manner similar to that of the above-summarized cell vents to thereby exhaust the gasses to the surrounding ambient environment.

A representative embodiment of the battery pack includes the elongated exhaust conduit, a plurality of fins collectively forming a baffle, and a plurality of battery cells arranged adjacent to the exhaust conduit. The exhaust conduit defines the gas flow channel therein, with the gas flow channel having a longitudinal center axis. The exhaust conduit has a terminal end that defines an exhaust port, with the pack vent disposed therein or otherwise covering the pack vent as noted above.

The fins in this particular representative embodiment are temperature-resistant flow diversion plates arranged at an angle relative to the longitudinal center axis and disposed within the gas flow channel. Each respective battery cell includes the outer casing. The outer casing defines a cell cavity and the cell vent opening. Each battery cell also includes an anode and a cathode disposed within the cell cavity, as well as a vent cap covering the cell vent opening. The vent cap, e.g., a thin membrane in some implementations, is configured open at a predetermined pressure to release hot gasses from the cell cavity into the gas flow channel as summarized above. The fins thereafter direct the expelled hot gases along the longitudinal center axis and toward the terminal end of the exhaust conduit, where the hot gasses are ultimately exhausted to the surrounding ambient environment through the pack vent.

In particular, a battery pack according to an exemplary embodiment includes an elongated exhaust conduit defining a gas flow channel therein, with the elongated exhaust conduit having a longitudinal center axis and a terminal end. Additionally, the battery pack includes a pack vent disposed within the terminal end of the elongated exhaust conduit, a plurality of fins disposed within the gas flow channel, and a plurality of battery cells arranged adjacent to the elongated exhaust conduit. In this embodiment, each respective battery cell of the plurality of battery cells includes an outer casing defining a cell cavity therein. with outer casing defining a cell vent opening, an anode and a cathode disposed within the cell cavity, and a vent cap. The vent cap covers the cell vent opening and is configured to open at a predetermined pressure to release hot gasses from the cell cavity into the gas flow channel. The fins are configured to direct the hot gasses along the longitudinal center axis and toward the terminal end and the pack vent.

In one or more embodiments, each respective fin is spaced apart from an adjacent fin by a first distance of separation adjacent the cell vent opening, and tapers toward the adjacent fin along the longitudinal center axis of the gas flow channel to a second distance of separation. The second distance of separation is about 25% to about 35% of the first distance of separation in a possible exemplary implementation.

A pair of fins may flank the vent cap and be arranged to impede the hot gasses from contacting an adjacent one of the vent caps. In such an embodiment, each of the fins is at least partially coextensive with two of the vent openings.

The plurality of battery cells may optionally include a plurality of prismatic battery cells.

The exhaust conduit in one or more embodiments may have trapezoidal cross sectional shape.

An aspect of the disclosure includes the elongated exhaust conduit defining a plurality of through-holes, with each respective one of the vent caps being coaxially aligned with a corresponding one of the through-holes.

The gas flow channel in one or more embodiments may have a first surface adjacent to the battery cells and a second surface diametrically opposite the battery cells. A distance of separation between each adjacent pair of the fins at the first surface equals a distance of separation between each adjacent pair of the fins at the second surface.

Also disclosed herein is an electrified powertrain system having a load, a polyphase electric traction motor connected to the load and powered by an alternating current (AC) voltage, a power inverter connected to the electric traction motor, and a propulsion battery pack connected to the power inverter. The power inverter is configured to invert a direct current (DC) voltage from the propulsion battery pack into the AC voltage. The battery pack in this embodiment includes an elongated exhaust conduit defining a gas flow channel therein, the elongated exhaust conduit having a longitudinal center axis and a terminal end. The terminal end contains a pack vent therein. Fins are disposed within the gas flow channel. The battery pack also includes a battery tray and a plurality of battery cells arranged adjacent to the elongated exhaust conduit. Each respective battery cell of the plurality of battery cells includes an outer casing defining a cell cavity therein, with the outer casing defining a cell vent opening. The battery cells also include an anode and a cathode disposed within the cell cavity, along with a vent cap covering the cell vent opening. The vent cap is configured open at a predetermined pressure to release hot gasses from the cell cavity into the gas flow channel, and wherein the fins are configured to direct the hot gasses along the longitudinal center axis and toward the terminal end and the pack vent.

A venting apparatus is also disclosed herein for use with a battery pack having a plurality of battery cells, each battery cell having a respective vent cap covering a cell vent opening, with the vent cap being configured to open at a predetermined pressure to release hot gasses from the cell cavity. The venting apparatus includes an elongated exhaust conduit defining a gas flow channel therein, the elongated exhaust conduit having a longitudinal center axis, a terminal end containing a pack vent, and defining a plurality of through-holes. The venting apparatus also includes a plurality of fins disposed within the gas flow channel. Each respective one of the through-holes is configured to admit the hot gasses from a corresponding one of the battery cells into the gas flow channel when the respective vent cap opens at the predetermined pressure. The fins are configured to direct the hot gasses along the longitudinal center axis and toward the terminal end and the pack vent.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 2 is a side view illustration of a battery pack including an elongated exhaust conduit according to an embodiment of the disclosure.

FIG. 3 is a side view illustration of the exemplary elongated exhaust conduit of FIG. 2.

FIG. 4 is an end view illustration of the elongated exhaust conduit depicted in FIGS. 2 and 3.

Figure 1:
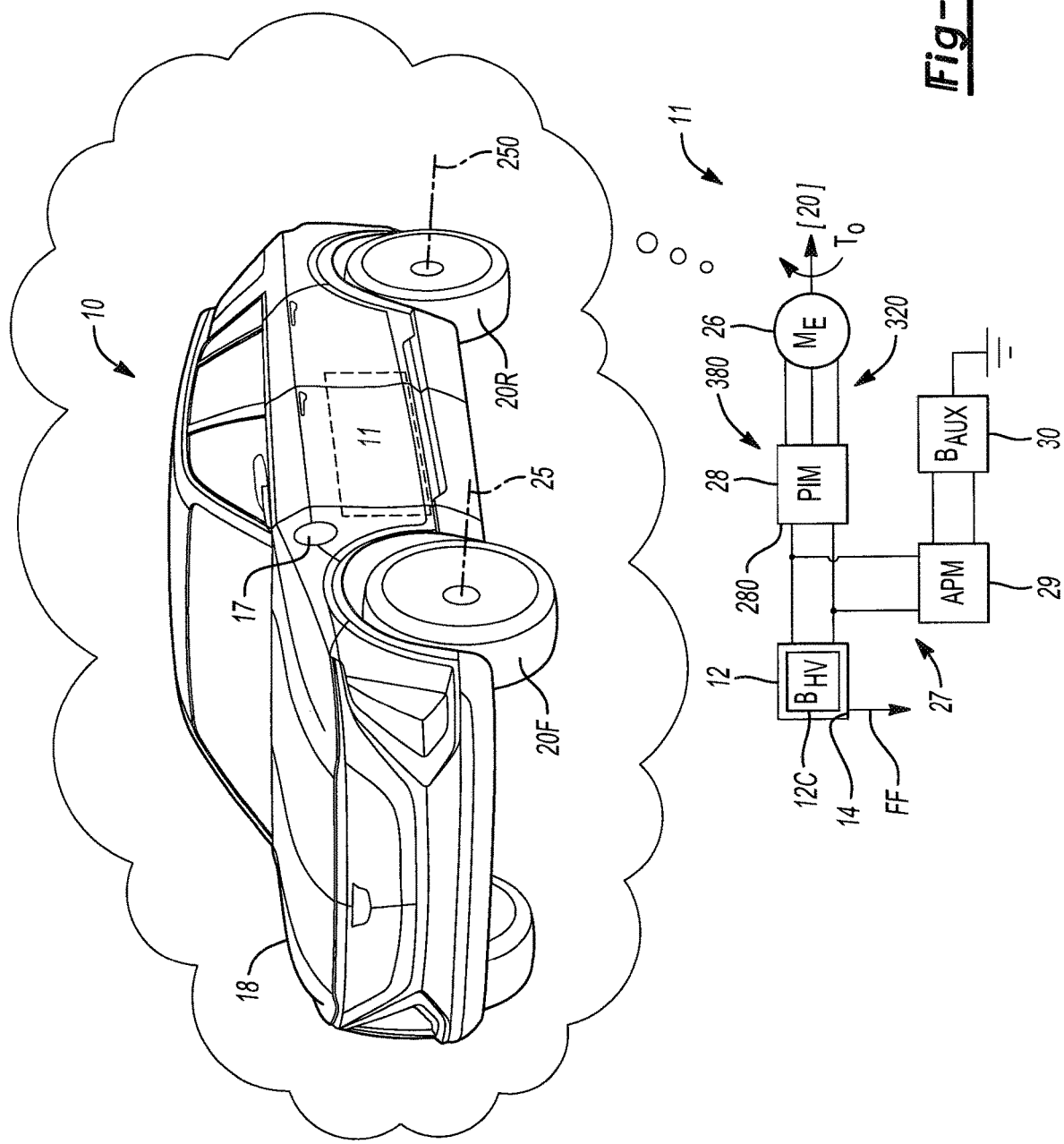
FIG. 1 is an exemplary motor vehicle having a propulsion battery pack equipped with an elongated exhaust conduit and a gas flow channel defined therein in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Referring to the drawings, wherein like reference numbers refer to like features throughout the several views, FIG. 1 depicts a motor vehicle 10 equipped with an electrified powertrain system 11, the latter of which includes a high-voltage propulsion battery pack (BHV) 12. The propulsion battery pack 12 shown schematically in FIG. 1 is equipped with a plurality of battery cells 12C, at least one pack vent 14, and an elongated exhaust conduit 50 (see FIGS. 2-4) constructed in accordance with the present disclosure. The exhaust conduit 50 for its part is in fluid communication with the pack vent 14 and the battery cells 12C, and is operable for directing hot gasses (arrow FF) from one or more of the battery cells 12C toward the pack vent 14 during a thermal runaway condition. The hot gases (arrow FF) and suspended particulate are ultimately expelled to the surrounding ambient environment through the pack vent 14.

The solutions set forth in detail above with reference to FIGS. 1-4 provide a way to direct the hot gasses (arrow FF) away from the propulsion battery pack 12 during thermal runaway, i.e., when one or more of the battery cells 12C enter an uncontrollable self-heating state. The exhaust conduit 50 efficiently and effectively directs the hot gasses (arrows FF) and suspended particulate matter away from adjacent battery cells 12C. The solutions thus eliminate interaction with the health and performance of proximate battery cells 12C within the propulsion battery pack 12, thus mitigating thermal runaway and propagation concerns.

As appreciated by those skilled in the art, propulsion battery packs of battery electric vehicles and other electrified powertrain systems, exemplified herein as the propulsion battery pack 12 and the electrified powertrain system 11 of FIG. 1, often include a battery cover or housing equipped with one or more perimeter pack vents. The pack vent 14 is representative of such a vent. A pressure-sensitive vent membrane (not shown) disposed within or covering such a perimeter vent, as well as individual cell vent openings 140 shown in FIGS. 2-4, are configured to burst when an internal pressure of the propulsion battery pack 12 or a given battery cell 12C exceeds a threshold pressure limit. This burst-triggering effect occurs in response to elevated temperatures experienced during thermal runaway.

For instance, cell pressures of about 20-25 kilopascals (kPa) are sufficient in some constructions for bursting a typical vent membrane, with the actual burst pressure depending on the particular application. Failure of the vent membrane in this manner allows captive hot gasses (arrow FF) to be quickly exhausted to the surrounding ambient environment under thermal runaway conditions, thereby sparing adjacent battery cells 12C from exposure to elevated temperatures and limiting thermal runaway to a particular originating battery cell 12C. Thus, pack-level venting occurs via the pack vent(s) 14 in conjunction with the cell-level venting of the individual cell vent openings 140 of FIGS. 2-4 within the scope of the present disclosure, with the improvements described below being directed to the routing of the hot gasses (arrow FF) toward the pack vent(s) 14.

In a non-limiting example configuration, the propulsion battery pack 12 shown in FIG. 1 is a high-capacity electrochemical energy storage device having a voltage capability of about 400-800 volts of direct current, i.e., VDC, with the actual voltage capability of the propulsion battery pack 12 being based on factors such as desired operating range, gross weight, and power rating of a load connected to and drawing energy from the propulsion battery pack 12. In a possible construction, the propulsion battery pack 12 may be generally composed of an array of lithium-ion or lithium-ion polymer rechargeable battery cells 12C, e.g., prismatic battery cells or cylindrical battery cells, or possibly pouch-style battery cells without limitation.

In a representative use case, the electrified powertrain system 11 shown schematically in FIG. 1 may be used as part of the motor vehicle 10 of FIG. 1 or another mobile system. As shown, the motor vehicle 10 may be embodied as a battery electric vehicle, with the present teachings also being extendable to plug-in hybrid electric vehicles. Alternatively, the electrified powertrain system 11 of FIG. 1 may be used as part of another mobile system such as but not limited to a rail vehicle, aircraft, marine vessel, robot, farm equipment, etc. Likewise, the electrified powertrain system 11 may be stationary, such as in the case of a powerplant, hoist, drive belt, or conveyor system. Therefore, the electrified powertrain system 11 of FIG. 1 in the representative vehicular embodiment of FIG. 1 is intended to be illustrative of the present teachings and not limiting thereof.

The motor vehicle 10 in the illustrated configuration includes a vehicle body 18 and road wheels 20F and 20R, with "F" and "R" indicating the respective front and rear positions. The road wheels 20F and 20R rotate about respective axes 25 and 250, with the road wheels 20F, the road wheels 20R, or both being powered by output torque (arrow $T_O$) from an electric traction motor ($M_E$) 26 of the electrified powertrain system 11, as indicated in FIG. 1 by arrow [20]. The road wheels 20F and 20R thus represent a mechanical load in this embodiment, with other possible loads being possible in different host systems.

To that end, the electrified powertrain system 11 using the propulsion battery pack 12 of the present disclosure includes a DC-to-alternating current (AC) power inverter, which is shown as a power inverter module (PIM) 28 arranged on a high-voltage DC bus 27. During a charging mode during which the propulsion battery pack 12 is recharged, a charging port 17 located on the vehicle body 18 may be used to connect a charge coupler (not shown) of an offboard charging station, e.g., a J1772 5-pin charge coupler. As appreciated in the art, the PIM 28 includes a DC side 280 and an alternating current (AC) side 380, with the latter being connected to individual phase windings (not shown) of a polyphase electric traction motor ($M_E$) 26 powered by an AC voltage. The propulsion battery pack 12 is connected to the DC side 280 of the PIM 28 such that a supplied battery voltage from the propulsion battery pack 12 is provided as an input voltage to the PIM 28 during discharging/propulsion modes of the motor vehicle 10.

The PIM 28, or more precisely a set of IGBTs, MOSFETs, or other fast-acting semiconductor switches (not shown) residing therein, are controlled via pulse width modulation, pulse density modulation, or other suitable switching control techniques to invert a DC input voltage present on the DC bus 27 into an AC output voltage suitable for energizing a high-voltage AC bus 320. High-speed switching of the resident semiconductor switches of the PIM 28 thus ultimately energizes the electric traction motor 26. The energized electric traction motor 26 causes the output torque (arrow $T_O$) to be generated and delivered as a motor drive torque to one or more of the road wheels 20F and/or 20R in the illustrated exemplary embodiment of FIG. 1, or to another coupled mechanical load in other implementations.

Additional electrical components of the electrified powertrain system 11 may also include an accessory power module (APM) 29 and an auxiliary battery ($B_{AUX}$) 30. The APM 29 may be configured as a DC-DC converter that is connected to the DC bus 27, as appreciated in the art. In operation, the APM 29 is capable, via internal switching and voltage transformation, of reducing a voltage level on the DC bus 27 to a lower level suitable for charging the auxiliary battery 30 and/or supplying low-voltage power to one or more accessories (not shown) such as lights, displays, etc. Thus, "high-voltage" as used herein refers to voltage levels in excess of typical 12-15 VDC low/auxiliary voltage levels, with 400 VDC or more being an exemplary high-voltage level in some embodiments of the propulsion battery pack 12.

Referring to FIG. 2, the propulsion battery pack 12 may include a battery tray 13 positioned with respect to the battery cells 12C. A foam layer 21 may be arranged between the battery tray 13 and the battery cells 12C for added insulation and cushioning of the battery cells 12C. Each respective one of the battery cells 12C is positioned on the battery tray 13, e.g., a rectangular plate that helps orient and secure the battery cells 12C in a desired arrangement. Additionally, each battery cell 12C includes an outer casing 35 defining a cell cavity 38 therein and having an outer surface 40 that defines a respective cell vent opening 140. A corresponding cell vent cap 55 spans or covers a respective cell vent opening 140. For instance, the cell vent cap 55 may be embodied as a thin membrane or a solid cap as noted above, which is operable for opening under a threshold cell pressure during thermal runaway. Bursting or ejection of the vent cap 55 under pressure releases hot gasses (arrows FF) that may be captive within the cell cavity 38.

Although some internal details of the battery cells 12C are omitted for illustrative simplicity, those skilled in the art will appreciate that the battery cells 12C contain within the cell cavity 38 an electrolyte material (not shown), working electrodes in the form of a cathode 42 and an anode 142, and a permeable separator. Such components are collectively enclosed inside the electrically-insulated outer casing 35. Grouped battery cells 12C may be connected in series or parallel through use of an electrical interconnect board and related buses, sensing hardware, and power electronics, which are likewise not shown but well understood in the art. An application-specific number of the battery cells 12C may be arranged in a battery housing 34 and thus supported relative to the battery tray 13, for instance in columns and rows. The battery housing 34 may be securely anchored to a chassis frame of the motor vehicle 10 shown in FIG. 1 and packaged within a rear trunk compartment, underneath a rear passenger bench seat, or underneath the floor of a passenger compartment as appreciated in the art.

Referring to FIG. 3 together with FIG. 2, the propulsion battery pack 12 shown in FIG. 2 includes an elongated exhaust conduit 50 defining a gas flow channel 52 therein. Additionally, the elongated exhaust conduit 50 defines a plurality of through-holes 58 (see FIG. 3) and includes a terminal end 54. A plurality of fins 56 are disposed within the gas flow channel 52, with the fins 56 collectively forming a baffle for directing the hot gasses (arrow FF) within the gas flow channel 52 and toward the terminal end 54.

A venting apparatus 39 of FIG. 3 as contemplated herein is composed of the elongated exhaust conduit 50 and the fins 56 disposed within the gas flow channel 52. In this particular construction, the cell vent openings 140 are coaxially-aligned with a respective one of the through-holes 58 in the elongated exhaust conduit 50. The cell vent openings 140 are configured, upon opening of a respective cell vent cap 55, to admit the hot gasses (arrow FF) from the cell cavity 38 of FIG. 2 into the gas flow channel 52, with the fins 56 directing the hot gasses (arrow FF) along the longitudinal center axis 500 of FIG. 3.

In the exemplary embodiment of FIGS. 2 and 3, the battery cells 12C of FIG. 2 are arranged adjacent to the elongated exhaust conduit 50. Each respective cell vent cap 55 has a center axis 55A that is coaxial with a respective one of the through-holes 58 and covers a corresponding one of the cell vent openings 140. As noted above, the cell vent cap 55 opens at a predetermined pressure to release the hot gasses (arrow FF) from the cell cavity 38 of one or more battery cells 12C experiencing a thermal runaway condition. The hot gasses (arrow FF) then flow into the gas flow channel 52, whereupon the fins 56 direct the hot gasses (arrow FF) toward the terminal end 54 of the exhaust conduit 50 for eventual discharge through the pack vent 14.

Traditionally, and in particular for cylindrical and can-type battery cells, a cell vent is located at a top of a battery cell relative to a normal upright orientation of a battery or battery pack. When such a battery cell experience thermal runaway, the hot gasses from a thermal runaway condition may tend to spread across a battery module to other proximate battery cells. The present solutions may be applied at a desired side of the battery cells 12C of the present application by connecting the elongated exhaust conduit 50 to such a side, e.g., a top, bottom, or lateral surface. For instance, one may attach the elongated exhaust conduit 50 along a bottom surface of the propulsion battery pack 12 which would enable the hot gasses (arrow FF) to be directed through the elongated exhaust conduit 50 and away from adjacent battery cells 12C and associated high-voltage components. Once the hot gasses (arrow FF) are flowing within the gas flow channel 52, the fins 56 guide the hot gasses (arrow FF) in such a manner that the hot gasses (arrow FF) do not interact with the remaining battery cells 12C.

The elongated exhaust conduit 50 as best shown in FIG. 3 may be constructed of a suitable temperature-resistant material such as steel or a metal alloy capable of withstanding the elevated temperatures of the exhaust gasses (arrow FF of FIG. 2), which may be about 1000° Celsius or more. In some embodiments, a pair of the fins 56 flanks each respective one of the cell vent caps 55 and is arranged to impede the hot gasses (arrow FF) from contacting an adjacent one of the cell vent caps 55. For instance, each respective cell vent cap 55 may be coaxially aligned with a corresponding one of the cell vent openings 140. In this exemplary embodiment, each fin 56 of the above-noted pair of fins 56 is at least partially coextensive with two of the cell vent openings 140.

In one or more embodiments, the fins 56 may be angled or curved/arcuate relative to the longitudinal center axis 500 of the elongated exhaust conduit 50. In terms of the optional arcuate or curved geometry of the individual fins 56, each respective fin 56 may be spaced a distance apart from an adjacent one of the fins 56 by a first distance of separation (D1) adjacent the cell vent opening 140 (see FIG. 3). Each fin 56 tapers toward the adjacent fin 56 along the longitudinal center axis 500 to a smaller second distance of separation (D2). Distal ends or edges 156 of adjacent fins 56 may be spaced apart by a distance (D3), which in one or more embodiments is the same as or substantially equals the first distance of separation (D1), e.g., within about ±10% or within manufacturing tolerances.

In a possible embodiment, the second distance of separation (D2) is about 25% to about 35% of the first and third distances of separation (D1 and D3). As shown, a pair of the fins 56 flanks the cell vent cap 55 and is arranged to impede the hot gasses (arrow FF) from contacting an adjacent one of the cell vent caps 55. In this manner, the trajectory of the hot gasses (arrow FF) limits contact to the particular battery cell(s) 12C currently experiencing thermal runaway. Moreover, the hot gasses (arrow FF) flow through the gas flow channel 52 in such a way that the gas flow channel 52 creates a "wide-to-narrow" or funnel-like tunnel opening, which in turn steers the hot gasses (arrow FF) away from the other battery cells 12C of the propulsion battery pack 12 of FIG. 2. To facilitate the desired flow control, the gas flow channel 52 has a first surface 59 adjacent to the battery cells 12C and a second surface 159 diametrically opposite to the battery tray 13 or battery cells 12C, with a distance of separation (D1) between each adjacent pair of the fins 56 at the first surface 59 equaling a distance of separation (D3) between each adjacent pair of the fins 56 at the second surface 159 in a possible construction.

Referring now to FIG. 4, which depicts the elongated exhaust conduit 50 along its longitudinal center axis 500 with the pack vent 14 of FIGS. 1-3 removed for clarity, a battery cell 12C is shown in side view having positive (+) and negative (−) electrode tabs 60 and 61, respectively. The elongated exhaust conduit 50 in one or more embodiments may have a trapezoidal cross sectional shape along the longitudinal center axis 500. An outer flange 63 of the elongated exhaust conduit 50 could be placed against a mating or interfacing surface 130 of the battery tray 13 and then welded, bonded, and/or fastened thereto. An angle (θ) is thus defined between a plane of the outer flange 63 and an angled wall 66 of the elongated exhaust conduit 50, with an exemplary angle (θ) of about 45° to about 60°. In this construction, the gas flow channel 52 has a major dimension (D4) along the interfacing surface 130 of the battery tray 13 and a minor dimension (D5) located diametrically opposite the cell vent opening 140.

For instance, the major dimension (D4) may be about twice as long as the minor dimension (D5) in a possible construction. The tapered shape of the gas flow channel 52, which may be achieved with the illustrated trapezoidal cross-sectional shape or using other shapes such as hemispherical, rectangular with chamfered corners, etc., may help concentrate the hot gasses (arrows FF) along the second surface 159 of the elongated exhaust conduit 50. Thus, the hot gasses (arrows FF) as shown in FIG. 3 would tend to be concentrated around or along the second surface 159 as the hot gasses (arrow FF) flow toward and eventually out of the pack vent 14.

The solutions set forth in detail above with reference to FIGS. 1-4 thus provide a way to direct the hot gasses (arrow FF) away from the propulsion battery pack 12 during thermal runaway, i.e., when one or more of the battery cells 12C enter an uncontrollable self-heating state. The present teachings could likewise be extended to other battery electric systems, such as mobile or stationary systems, multi-module/multi-pack systems, etc. Use of the elongated exhaust conduit 50 and the fins 56 may help direct the hot gasses (arrows FF) and suspended particulate matter away from adjacent battery cells 12C. The solutions thus eliminate interaction with the health and performance of proximate battery cells 12C, thus mitigating thermal runaway and propagation concerns. These and other attendant benefits will be readily appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A battery pack comprising:
   an elongated exhaust conduit defining a gas flow channel therein, the elongated exhaust conduit having a longitudinal center axis and a terminal end;
   a pack vent disposed within the terminal end of the elongated exhaust conduit;
   a plurality of fins disposed within the gas flow channel, each respective fin of the plurality of fins being overlapping or coextensive along the longitudinal center axis with adjacent fins of the plurality of fins, thereby creating a funnel-like tunnel opening in the gas flow channel; and
   a plurality of battery cells arranged adjacent to and above the elongated exhaust conduit, wherein each respective battery cell of the plurality of battery cells comprises:
      an outer casing defining a cell cavity therein, wherein the outer casing defines a cell vent opening;
      an anode and a cathode disposed within the cell cavity; and
      a vent cap covering the cell vent opening, wherein the vent cap is configured to open at a predetermined pressure to release hot gasses from the cell cavity into the gas flow channel, and wherein the fins are configured to direct the hot gasses along the longitudinal center axis and toward the terminal end and the pack vent.

2. The battery pack of claim 1, wherein each respective fin of the plurality of fins is spaced apart from an adjacent fin of the plurality of fins by a first distance of separation adjacent the cell vent opening, and tapers toward the adjacent fin along the longitudinal center axis of the gas flow channel to a second distance of separation.

3. The battery pack of claim 2, wherein the second distance of separation is about 25% to about 35% of the first distance of separation.

4. The battery pack of claim 2, wherein a pair of fins of the plurality of fins flanks the vent cap and is arranged to impede the hot gasses from contacting an adjacent one of the vent caps.

5. The battery pack of claim 4, wherein each fin of the pair of fins is at least partially coextensive with two of the vent openings.

6. The battery pack of claim 1, wherein the plurality of battery cells includes a plurality of prismatic battery cells.

7. The battery pack of claim 1, wherein the exhaust conduit has a trapezoidal cross sectional shape.

8. The battery pack of claim 1, wherein the elongated exhaust conduit defines a plurality of through-holes, and wherein each respective one of the vent caps is coaxially aligned with a corresponding one of the through-holes.

9. The battery pack of claim 1, wherein the gas flow channel has a first surface adjacent to the battery cells and a second surface diametrically opposite the battery cells, and wherein a distance of separation between each adjacent pair of the fins at the first surface equals a distance of separation between each adjacent pair of the fins at the second surface.

10. An electrified powertrain system comprising:
    a load;
    polyphase electric traction motor connected to the load and powered by an alternating current (AC) voltage;
    a power inverter connected to the electric traction motor;
    a propulsion battery pack connected to the power inverter, wherein the power inverter is configured to invert a direct current (DC) voltage from the propulsion battery pack into the AC voltage, the battery pack comprising:
       an elongated exhaust conduit defining a gas flow channel therein, the elongated exhaust conduit having a longitudinal center axis and a terminal end, wherein the terminal end contains a pack vent therein;
       a plurality of fins disposed within the gas flow channel, each respective fin of the plurality of fins being overlapping or coextensive along the longitudinal center axis with adjacent fins of the plurality of fins, thereby creating in the gas flow channel a funnel-like tunnel opening;
       a battery tray positioned below the elongated exhaust conduit; and
       a plurality of battery cells arranged on the battery tray adjacent to the elongated exhaust conduit, wherein each respective battery cell of the plurality of battery cells comprises:
          an outer casing defining a cell cavity therein, wherein the outer casing defines a cell vent opening;
          an anode and a cathode disposed within the cell cavity; and
          a vent cap covering the cell vent opening, wherein the vent cap is configured to open at a predetermined pressure to release hot gasses from the cell cavity into the gas flow channel, and wherein the fins are configured to direct the hot gasses along the longitudinal center axis and toward the terminal end and the pack vent.

11. The electrified powertrain system of claim 10, wherein the electrified powertrain system is used aboard a motor vehicle having a plurality of road wheels, and wherein the load includes one or more of the road wheels.

12. The electrified powertrain system of claim 10, wherein each respective fin of the plurality of fins is spaced apart from an adjacent fin of the plurality of fins by a first distance of separation adjacent the cell vent opening, and tapers toward the adjacent fin along the longitudinal center axis of the gas flow channel to a second distance of separation.

13. The electrified powertrain system of claim 12, wherein the second distance of separation is about 25% to about 35% of the first distance of separation.

14. The electrified powertrain system of claim 12, wherein a pair of fins of the plurality of fins flanks the vent cap and is arranged to impede the hot gasses from contacting an adjacent one of the vent caps.

15. The electrified powertrain system of claim 14, wherein each fin of the pair of fins is at least partially coextensive with two of the vent openings.

16. The electrified powertrain system of claim 10, wherein the plurality of battery cells includes a plurality of prismatic battery cells.

17. The electrified powertrain system of claim 10, wherein the exhaust conduit has a trapezoidal cross sectional shape.

18. The electrified powertrain system of claim 10, wherein the elongated gas flow channel has a first surface adjacent to the battery cells and a second surface diametrically opposite to the battery cells, and wherein a distance of separation between each adjacent pair of the fins is the same at the first surface as at the second surface.

19. A venting apparatus for use with a battery pack having a plurality of battery cells, each respective one of the battery cells having an outer casing defining a cell cavity therein, wherein the outer casing defines a cell vent opening, and a respective vent cap covering the cell vent opening, the vent cap being configured to open at a predetermined pressure to release hot gasses from the cell cavity, the venting apparatus comprising:

an elongated exhaust conduit positioned below the battery cells and defining a gas flow channel, the elongated exhaust conduit having a longitudinal center axis, a terminal end containing a pack vent, and defining a plurality of through-holes; and a plurality of fins disposed within the gas flow channel, each of the fins being overlapping or coextensive, along the longitudinal center axis, with adjacent fins of the plurality of fins to create in the gas flow channel a wide-to-narrow or funnel-like tunnel opening to steer the hot gasses away from other of the battery cells, wherein each respective one of the through-holes is configured to admit the hot gasses from a corresponding one of the battery cells into the gas flow channel when the respective vent cap opens at the predetermined pressure, and wherein the fins are configured to direct the hot gasses along the longitudinal center axis and toward the terminal end and the pack vent.

20. The venting apparatus of claim 19, wherein the elongated exhaust conduit has a trapezoidal cross-sectional shape.

* * * * *